(12) United States Patent
Lorenz et al.

(10) Patent No.: US 9,830,124 B2
(45) Date of Patent: Nov. 28, 2017

(54) CONVERSION OF PERIPHERAL SENSOR INTERFACE SIGNALS INTO AUDIO SIGNALS

(71) Applicant: HARMAN BECKER AUTOMOTIVE SYSTEMS GMBH, Karlsbad (DE)

(72) Inventors: Franz Lorenz, Kelheim (DE); Gerhard Pfaffinger, Regensburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 15/190,548

(22) Filed: Jun. 23, 2016

(65) Prior Publication Data
US 2016/0378425 A1 Dec. 29, 2016

(30) Foreign Application Priority Data
Jun. 23, 2015 (EP) ..................... 15173426

(51) Int. Cl.
| | | |
|---|---|---|
| *G06F 3/16* | (2006.01) | |
| *B60Q 5/00* | (2006.01) | |
| *H04R 3/00* | (2006.01) | |
| *B60R 21/0132* | (2006.01) | |
| *B60R 21/0136* | (2006.01) | |
| *G08G 1/16* | (2006.01) | |

(52) U.S. Cl.
CPC ............. *G06F 3/162* (2013.01); *B60Q 5/005* (2013.01); *B60Q 5/006* (2013.01); *G06F 3/167* (2013.01); *H04R 3/00* (2013.01); *B60R 21/0132* (2013.01); *B60R 21/0136* (2013.01); *G08G 1/166* (2013.01)

(58) Field of Classification Search
CPC ........ B60W 30/08; G01P 15/00; G06F 3/167; G06F 3/162; B60Q 5/005; B60Q 5/006; G08G 1/166; B60R 21/0132; B60R 21/0136
See application file for complete search history.

(56) References Cited

U.S. PATENT DOCUMENTS

| | | | | |
|---|---|---|---|---|
| 2015/0006037 A1* | 1/2015 | Ghannam | ........... | B60R 21/0136 701/45 |
| 2016/0157041 A1* | 6/2016 | Shiozawa | ............... | H04S 7/302 381/302 |
| 2016/0352120 A1* | 12/2016 | Lovett | ................... | H02J 7/0047 |

FOREIGN PATENT DOCUMENTS

| | | | | |
|---|---|---|---|---|
| DE | EP 2090897 A1 * | 8/2009 | ......... | G01S 7/52004 |
| EP | 2090897 A1 | 8/2009 | | |

OTHER PUBLICATIONS

"PSI5 Peripheral Sensor Interface", Technical Specification, V1.3, Jul. 29, 2008, 48 pages.
"Automotive Electronics Product Information CF190-PSI5 Receiver", Robert Bosch GmbH, Jul. 30, 2010, 4 pages.
European Search Report for corresponding Application No. EP 15 17 3426, Dec. 11, 2015, 9 pages.

* cited by examiner

*Primary Examiner* — Brenda Bernardi
(74) *Attorney, Agent, or Firm* — Brooks Kushman P.C.

(57) ABSTRACT

The present invention relates to a Peripheral Sensor Interface (PSI5) system. The PSI5 system includes a PSI5 controller and an audio converter. The audio converter is configured to receive signals from the PSI5 controller and to convert the received signals into audio signals.

19 Claims, 4 Drawing Sheets

Possible Variant 1

Possible Variant 2

CONVERSION OF PERIPHERAL SENSOR INTERFACE SIGNALS INTO AUDIO SIGNALS

CROSS-REFERENCE TO RELATED APPLICATIONS

This application claims priority to EP application Serial No. 15173426.6 filed Jun. 23, 2015, the disclosure of which is hereby incorporated in its entirety by reference herein.

FIELD OF INVENTION

The present invention relates to the Peripheral Sensor Interface (PSI5) for automotive sensor applications.

BACKGROUND OF THE INVENTION

Peripheral Sensor Interface (PSI5) technology represents a standard for data transmission in automotive safety applications (see www.psi5.org). Originally designed for airbag applications latest specifications cover additional fields of application like engine management and vehicle dynamics. Automotive systems or components use the PSI5 interface for communication between peripheral sensors/actuators and a control unit. PSI5 connects sensors or actuators to a control unit on the basis of a two-wire cable. The cable serves both for power supply of the sensors or actuators and for data communication.

An application of this controller was in the automotive Road Noise Compensation (RNC) project. The RNC algorithm works with acceleration values coming from the driving and coupled axles. The accelerations are measured with sensors which use the PSI5 interface as communication, diagnostic and supply voltage. The controller collects all these acceleration data and transmit them directly and digital, without any losses of accuracy and other transformations, to the digital signal processor (DSP). This DSP will then calculate the RNC signals to reduce the noise level in the vehicle compartment.

Another automotive application could be, to get radar information from an PSI5 radar sensor of the front bumper. These sensors are connected via PSI5 interface to a processing unit, where a digital signal processor calculates the distance between the front of the vehicle and pedestrians or any objects.

However, the usage of data provided by conventional PSI5 controllers is very limited, since presently any conventional PSI5 controller outputs a data format that is merely suitable for directly controlling the activation of some means, for example, an airbag in a vehicle. Therefore, it is an object of the present invention to provide for means for using data supplied by a PSI5 controller in response to sensor data in a more flexible manner as compared to the art.

SUMMARY

The above-mentioned object is addressed by a Peripheral Sensor Interface (PSI5) system comprising a PSI5 controller and an audio converter configured to receive signals from the PSI5 controller and to convert the received signals into audio signals. Contrary, to the art, the inventive PSI5 system, for example, allows for directly outputting warnings and other information to a driver of a vehicle equipped with PSI5 sensor technology. Information present in signals generated by the PSI5 controller can, therefore, be used more flexible than in the art.

In particular, the PSI5 system may comprise a sensor configured to supply sensor signals to the PSI5 controller and the PSI5 controller may be configured to supply the signals received by the audio converter based on the sensor signals. For example, a pressure or acceleration sensor detects a particular event and signals information on the detection to the PSI5 controller that in response generates particular signals. The particular event can be the sudden approach of a pedestrian within some predetermined distance of the vehicle, for example. The particular signals can in course be converted by the audio converter into audio signals that can be output to a driver or passenger of a vehicle wherein the PSI5 system is installed by means of an audio device.

The inventive PSI5 system may further comprise a digital signal processor (DSP) that is configured to process the audio signals and to supply the processed audio signals to an audio device installed in a vehicle. Particularly, the DSP may be configured to achieve noise reduction and/or echo compensation of the audio signals provided by the audio converter. The audio converter may comprise a high speed controller and a time-division multiplexing (TDM) bridge. In particular, the audio converter can be configured to scale and to filter the incoming sensor data. By this kind of preprocessing, the information provided by the sensors can be adapted properly to the subsequent processing by the DSP, for example. Thus, sensors can be exchanged by other ones without the need for exchanging any processing means receiving data from the audio converter.

According to a particular embodiment the high speed controller and the TDM bridge are integrated on one single microchip. The PSI5 controller may be integrated on the same single microchip. More generally, the PSI5 controller and the audio converter may be integrated in one single microchip thereby providing the advantages of cost reduction and compact configuration. In fact, herein it is also provided a microchip on which the PSI5 controller and the audio converter or on which the high speed controller and the TDM bridge as well as the PSI5 controller are integrated.

The above-mentioned object is also addressed by a method for outputting an acoustic message to a driver or passenger of a vehicle, wherein a Peripheral Sensor Interface (PSI5) system is installed in the vehicle, the PSI system comprising a sensor, a PSI5 controller and an audio converter, comprising the steps of detecting an event (which can be some predetermined event as the sudden approach of a pedestrian within some predetermined distance of the vehicle, for example) by the sensor and supplying sensor signals in response to the detection of the event from the sensor to the PSI5 controller. The method further comprises the steps of supplying signals from the PSI5 controller to the audio converter in response to the reception of the sensor signals; converting the signals received from the PSI5 controller into audio signals by the audio converter, for example, by means of a time-division multiplexing (TDM), bridge; and outputting the audio signals to the driver or passenger.

According to an embodiment of the method the audio signals are output by the audio converter to a digital signal processor, DSP, that enhances the quality of the audio signals by noise reduction and/or echo compensation and supplies the thus enhanced audio signals after noise reduction and/or echo compensation from the DSP to an audio device installed in the vehicle for outputting an acoustic message.

BRIEF DESCRIPTION OF THE DRAWINGS

Additional features and advantages of the present invention will be described with reference to the drawings. In the description, reference is made to the accompanying figures that are meant to illustrate preferred embodiments of the invention. It is understood that such embodiments do not represent the full scope of the invention.

DESCRIPTION OF THE INVENTION

The present invention relates to PSI5 technology and can be implemented in the context of standard schemes of data transmission between sensors and the PSI5 interface. According to the present invention, data provided by the PSI5 interface/controller is converted to audio data that can be output to a driver of a vehicle equipped with the PSI5 technology.

Figure 1:
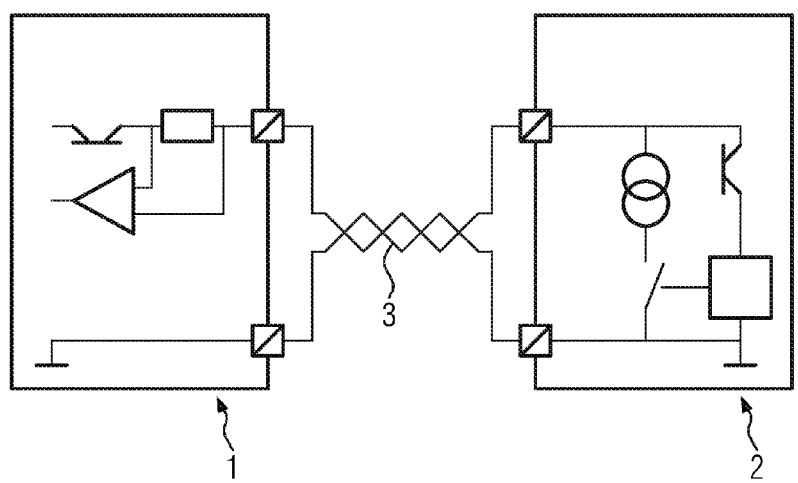
FIG. 1 illustrates a basic scheme of PSI5 data transmission between a sensor and a receiver.

PSI5 installed in a vehicle, for example, an automobile, may connect sensors or actuators to a receiver on the basis of a two-wire cable. The cable serves both for power supply of the sensors or actuators and for data communication. FIG. 1 illustrates a basic scheme of data transmission. A receiver 1 and a sensor 2 are connected to each other by means of a twisted cable pair 3. The sensor 2 may be a crash sensor as an acceleration sensor or a pressure sensor. For bidirectional communication specific sync pulse patterns are used to transmit commands to the sensor, for example, for sensor addressing in case of a daisy chain bus, and the configuration of bus devices. The sensor 2 responds within predefined time slots with current-modulated data.

Figure 2:
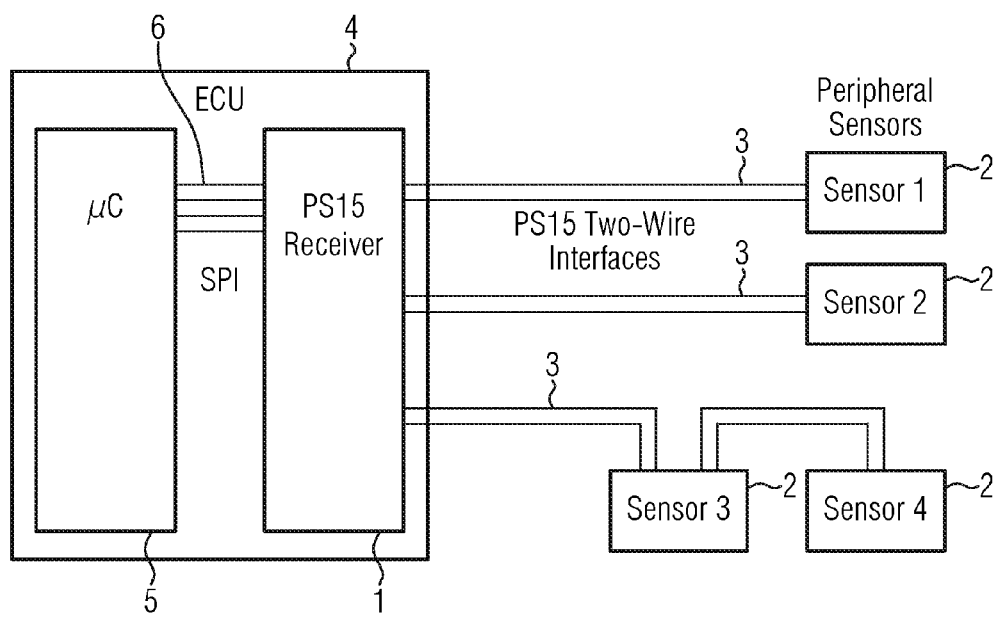
FIG. 2 illustrates an example of a control system comprising an electronic control unit with a PSI5 receiver and a plurality of sensors.

As illustrated in FIG. 2, a control system may comprise an electronic control unit (ECU) 4 and peripheral sensors 2. The ECU comprises a PSI5 receiver 1 and a microcontroller 5 connected to each other by a PSI5 interface 6. The receiver 1 may be an asynchronous serial interface (ASI) transceiver that provides a pre-regulated voltage to the sensors 2 and reads in the transmitted sensor data provided by the peripheral sensors. The example above shows a point-to-point connection for sensor 1 and 2 and two different bus configurations for sensor 3 and 4.

In principle, Manchester coded digital data transmission can be implemented. The ECU may transmit so-called "sync pulses" by modulation of the voltage. The sensors 2 respond within predefined time slots with current-modulated data. Alternatively, data can be transmitted asynchronously wherein data words are sent in specified time intervals. Sync pulses are not required in this case.

Figure 3:
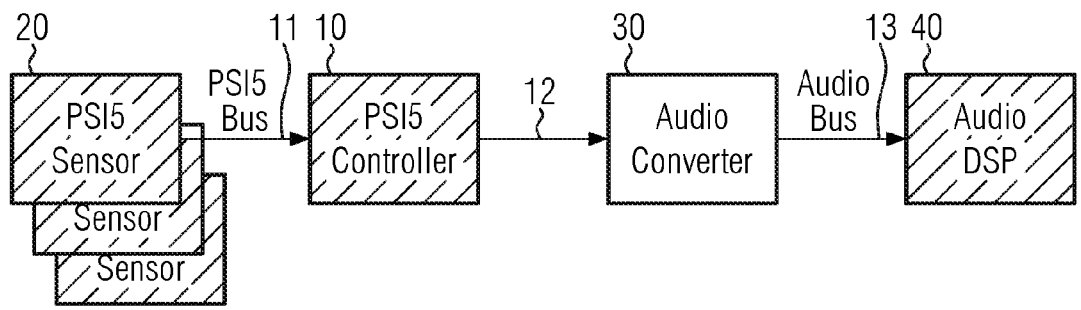
FIG. 3 illustrates two exemplary configurations of PSI5 technology including an audio converter.
Figure 3:
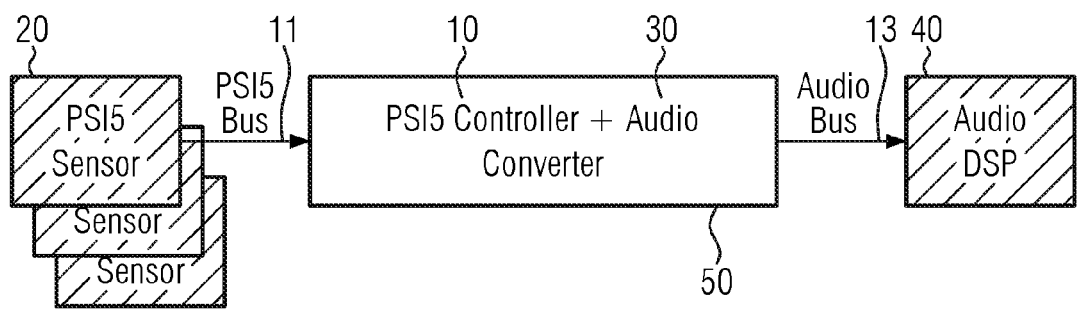

In the context of the above-described configurations embodiments of the present invention can be implemented. Two examples for the inventive configuration are shown in FIG. 3. According to the upper row of FIG. 3 a PSI5 controller 10 and sensors 20 are connected to each other by PSI5 buses 11. The PSI5 controller 10 is connected via a data connection 12 to an audio converter 30. The audio converter 30 is connected via an audio bus 13 to a DSP 40. The example shown in the lower row of FIG. 3 differs from the one shown in the upper row by the integration of the PSI5 controller 10 and audio converter 30 in a single unit 50, for example, a single microchip. The audio converter 30 is configured to convert signals supplied by the PSI5 controller 10 into audio signals (for example, 24 bit 192 kHz) that can be processed by the DSP 40.

The DSP 40 may comprise a high speed controller and a time-division multiplexing (TDM) bridge. The DSP 40 may include an Analog-to-Digital converter if the audio converter outputs an analog audio signal. However, it might be preferred that the audio converter outputs a digital audio signal. In any case, a digital audio signal may be processed by the DSP 40 in order to obtain an enhanced digital audio signal. Enhancement refers to noise reduction and/or echo compensation. The enhanced digital audio signal may be converted by a Digital-to-Analog converter of the DSP 40 to obtain an enhanced analog audio signal that can be output by an audio device installed in the vehicle. Thus, sensor data received by the PSI5 controller 10 from a sensor 20 cause the generation of PSI5 data by the PSI5 controller 10 and this PSI5 data is converted to audio data by the audio converter 30 and further processed for outputting by the audio DSP 40. Thereby, a driver of the vehicle can be given an acoustic warning in response to particular predetermined kinds of sensor data indicating some security problem, for example. For example, a warning can be output when distance between the front of the vehicle wherein the PSI5 system is installed and pedestrians or any objects outside the vehicle that is detected by appropriate sensors is determined to be below some predetermined threshold. This predetermined threshold may be a function of the velocity of the vehicle.

Figure 4:
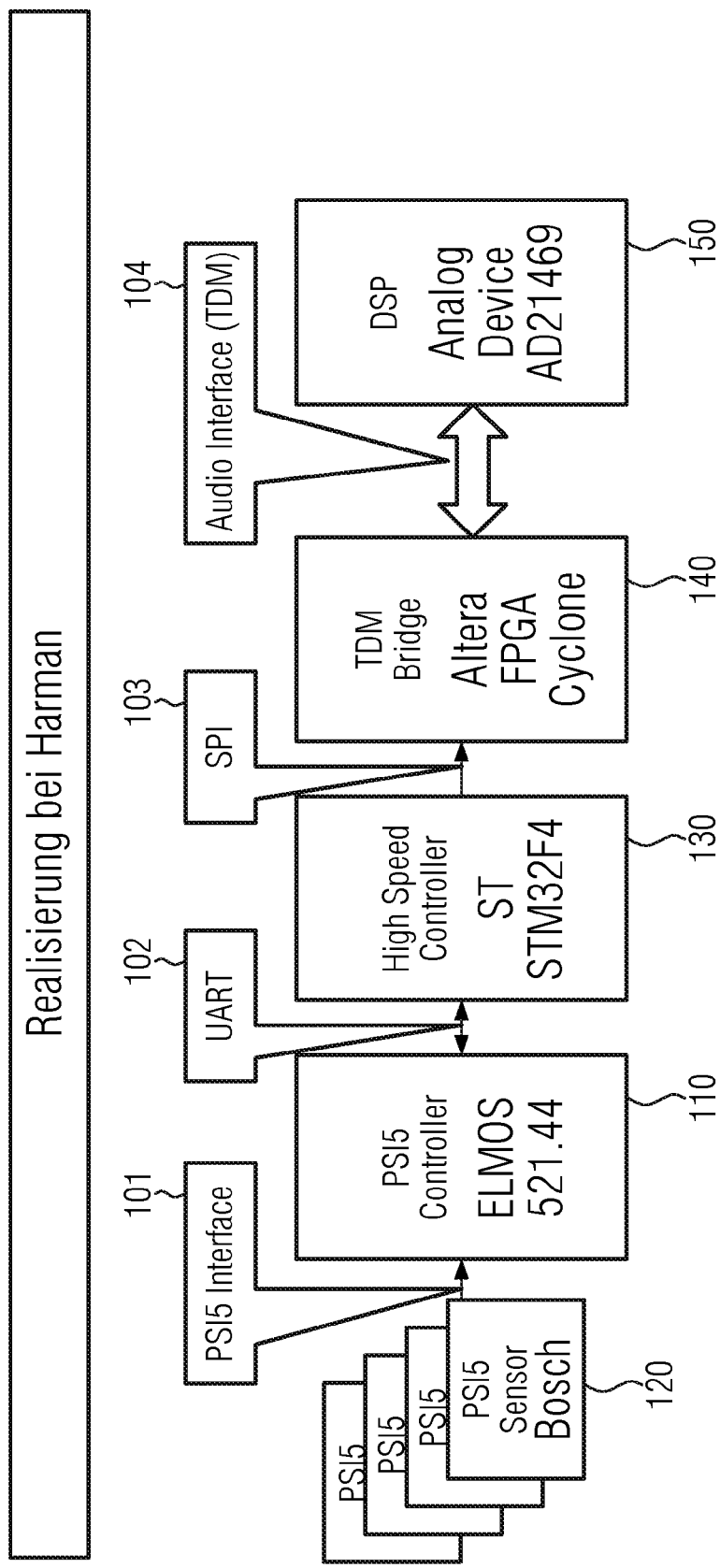
FIG. 4 shows an example for the inventive PSI5 system including an audio converter.

A particular example for the inventive PSI5 system is shown in FIG. 4. Sensors 120 send sensor data via PSI5 interface 101 in asynchronous mode to a PSI5 Controller 110. According to the PSI5 standard, asynchronous means that the sensors will automatically send their data to the PSI5 controller with their own sampling rates. There is no need for the PSI5 controller in this application to generate a so called SYNC pulse and the maximum transfer rate of the sensor is always guaranteed. In this example, the PSI5 Controller 110 is an ELMOS 521.44 controller. This PSI5 Controller is connected to a high speed controller 130 via a serial interface realized by a universal asynchronous receiver transmitter (UART) 102.

The PSI5 controller sends automatically, with a baudrate of about 8 Mbit per seconds, the received sensor data. Moreover, initialization data of the internal registers of the PSI5 controller will also be sent through this connection. The high speed controller 130 is a STM32F4 controller which is an ARM®-Cortex®-M4-based microcontroller and will receive these high speed data stream, decode the protocol and extract the sensor data information. Furthermore, the controller handles diagnostics tasks, like short-cut to ground, short-cut to supply voltage, cable break etc. The high speed controller 130 is connected via a synchronous serial data link 103 to a TDM bridge 140. The synchronous serial data link 103 can be realized by a serial peripheral interface ("SPI") bus where only the data of the sensors will be transmitted. In the shown example, the TDM bridge 140 is an Altera field programmable gate array (FPGA) cyclone including embedded memory, external memory interfaces and clock management circuitry. The Altera FPGA cyclone receives the incoming data from the high speed controller, stores the data into its internal data buffer and transmits the data signals to the following signal processing unit. In the FPGA, there is also the possibility to scale and to filter the incoming sensor data to adapt these kinds of information to the following signal processing.

A particular advantage of this "preprocessing" can be seen in the possibility, that the sensors can be exchanged by sensors of any other types whereas the following signal processing can remain unchanged.

The audio signals are supplied to a DSP 150 via a TDM audio interface 104. In the shown example, the DSP 150 is an Analog Device AD21469. The DSP can easily receive and process the sensor data as a synchronous data stream without any additional efforts for diagnostics tasks etc. The internal audio framework of the DSP can be used without any adaption to handle the sensor data of accelerometers, for example.

According to alternative embodiments either the TDM bridge 140 and the DSP 150 or the TDM bridge 140, the DSP 150 and the PSI5 Controller 110 are integrated on one single microchip.

All previously discussed embodiments are not intended as limitations but serve as examples illustrating features and advantages of the invention. It is to be understood that some or all of the above described features can also be combined in different ways.

What is claimed is:

1. A peripheral sensor interface (PSI5) system comprising:
    a PSI5 controller; and
    an audio converter configured to receive signals from the PSI5 controller and to convert the received signals into audio signals.

2. The PSI5 system according to claim 1, further comprising a sensor configured to supply sensor signals to the PSI5 controller and wherein the PSI5 controller is configured to supply the signals received by the audio converter based on the sensor signals.

3. The PSI5 system according to claim 2, wherein the sensor is a pressure sensor or an acceleration sensor.

4. The PSI5 system according to claim 1, further comprising a digital signal processor (DSP) configured to process the audio signals and to supply the processed audio signals to an audio device installed in a vehicle.

5. The PSI5 system according to claim 4, wherein the DSP is configured to process the audio signals for noise reduction and/or echo compensation.

6. The PSI5 system according to claim 1, wherein the audio converter comprises a high speed controller and a time-division multiplexing (TDM) bridge.

7. The PSI5 system according to claim 6, wherein the high speed controller and the TDM bridge are integrated on one single microchip.

8. The PSI5 system according to claim 7, wherein the PSI5 controller is integrated on the one single microchip.

9. The PSI5 system according to claim 1, wherein the PSI5 controller and the audio converter are integrated on one single microchip.

10. A method for outputting an acoustic message to a driver or passenger of a vehicle, wherein a Peripheral Sensor Interface (PSI5) system is installed in the vehicle, the PSI system comprising a sensor, a PSI5 controller and an audio converter, the method comprising the steps of:
    detecting an event by the sensor;
    supplying sensor signals to the PSI5 controller in response to detecting the event;
    supplying signals from the PSI5 controller to the audio converter in response to receiving the sensor signals;
    converting the signals received from the PSI5 controller into audio signals by the audio converter; and
    outputting the audio signals to the driver or passenger.

11. The method according to claim 10, further comprising:
    supplying the audio signals from the audio converter to a digital signal processor (DSP);
    enhancing quality of the audio signals by noise reduction and/or echo compensation by the DSP; and
    supplying the audio signals after noise reduction and/or the echo compensation from the DSP to an audio device installed in the vehicle for outputting.

12. The method according to claim 10, wherein the audio converter converts the signals received from the PSI5 controller into the audio signals via a time-division multiplexing (TDM) bridge.

13. The method according to claim 12, wherein the TDM bridge scales and filters the sensor signals.

14. A microchip comprising a PSI5 controller and an audio converter.

15. The microchip according to claim 14, wherein the audio converter comprises a high speed controller and a time-division multiplexing, TDM, bridge.

16. A peripheral sensor interface (PSI5) system comprising:
    a crash sensor including a pressure sensor or an acceleration sensor and configured to transmit sensor signals indicative of a detected event;
    a PSI5 controller configured to transmit signals in response to the sensor signals; and
    an audio converter configured to receive the signals and to convert the received signals into audio signals to alert a driver of a vehicle.

17. The system of claim 16 further comprising a plurality of PSI5 busses coupled to the sensor and to the PSI5 controller for providing the sensor signals to the PSI5 controller.

18. The PSI5 system according to claim 16, further comprising a digital signal processor (DSP) configured to process the audio signals and to supply the processed audio signals to an audio device installed in a vehicle.

19. The PSI5 system according to claim 18, wherein the DSP is configured to process the audio signals for noise reduction and/or echo compensation.

* * * * *